(12) United States Patent
Penterman et al.

(10) Patent No.: US 9,291,284 B2
(45) Date of Patent: Mar. 22, 2016

(54) MICRO-PUMP OR NORMALLY-OFF MICRO-VALVE

(75) Inventors: Roel Penterman, Tisselt (BE); Johannes Van Eemeren, Helmond (NL); Reinhold Wimberger-Friedl, Veldhoven (NL); Hendrik Van Amerongen, Eindhoven (NL)

(73) Assignee: Biocartis NV, Mechelen (BE)

( * ) Notice: Subject to any disclaimer, the term of this patent is extended or adjusted under 35 U.S.C. 154(b) by 77 days.

(21) Appl. No.: 13/980,586

(22) PCT Filed: Jan. 20, 2012

(86) PCT No.: PCT/EP2012/050835
§ 371 (c)(1),
(2), (4) Date: Jul. 19, 2013

(87) PCT Pub. No.: WO2012/098214
PCT Pub. Date: Jul. 26, 2012

(65) Prior Publication Data
US 2013/0299015 A1    Nov. 14, 2013

(30) Foreign Application Priority Data

Jan. 21, 2011  (EP) .................................... 11151705

(51) Int. Cl.
*G01N 15/06*  (2006.01)
*G01N 33/00*  (2006.01)
(Continued)

(52) U.S. Cl.
CPC ........... *F16K 51/00* (2013.01); *B01L 3/502738* (2013.01); *F16K 99/0001* (2013.01); *F16K 99/0015* (2013.01); *F16K 99/0057* (2013.01); *F16K 99/0059* (2013.01);
(Continued)

(58) Field of Classification Search
CPC ........ G01N 15/06; G01N 33/00; G01N 33/48
USPC .................................. 422/502, 503, 504, 537
See application file for complete search history.

(56) References Cited

U.S. PATENT DOCUMENTS 5,725,363 A * 3/1998 Bustgens et al. ............ 417/413.1
5,926,955 A * 7/1999 Kober ....................... 29/890.127
(Continued)

FOREIGN PATENT DOCUMENTS

| CN | 101520034 | 9/2009 | ............. F04B 43/02 |
| CN | 101588838 | 11/2009 | ............. A61M 39/24 |

(Continued)

OTHER PUBLICATIONS

Laser et al., "A Review of Micropumps," Department of Mechanical Engineering, Stanford University, Stanford, CA, Institute of Physics Publishing, Journal of Micromechanics and Microengineering, J. Micromech. Microeng. 14, 2004.

(Continued)

*Primary Examiner* — Brian J Sines
(74) *Attorney, Agent, or Firm* — Kusner & Jaffe

(57) ABSTRACT

The invention relates to a micro valve for use in a biosensor, a micro fluidic device, use of such a device, and a micro fluidic element. Biosensors are used for detection of molecules and/or ions, such as protein, drug, DNA, RNA, hormone, glucose, insulin, enzyme, fungus, bacterium, etc., in a biological sample. The sensor can be used for diagnostic application, but for instance also drugs, either therapeutic or abuse, may be detected in for instance blood, urine and saliva.

20 Claims, 5 Drawing Sheets

(51) Int. Cl.
  *G01N 33/48*  (2006.01)
  *F16K 51/00*  (2006.01)
  *B01L 3/00*   (2006.01)
  *F16K 99/00*  (2006.01)

(52) U.S. Cl.
  CPC . *B01L 2300/0874* (2013.01); *B01L 2300/0887* (2013.01); *B01L 2400/0655* (2013.01); *F16K 2099/008* (2013.01); *F16K 2099/0084* (2013.01); *F16K 2099/0094* (2013.01); *Y10T 137/794* (2015.04)

(56) References Cited

U.S. PATENT DOCUMENTS

| | | | | |
|---|---|---|---|---|
| 6,109,889 | A * | 8/2000 | Zengerle et al. | 417/413.2 |
| 6,261,066 | B1 * | 7/2001 | Linnemann et al. | 417/53 |
| 8,920,386 | B2 | 12/2014 | Cefai et al. | 604/247 |
| 2007/0026269 | A1 | 2/2007 | Nakakubo | 429/13 |
| 2007/0237686 | A1 | 10/2007 | Mathies et al. | 422/103 |
| 2007/0275455 | A1 | 11/2007 | Hung et al. | 435/287.1 |
| 2009/0185955 | A1 | 7/2009 | Nellissen | 422/68.1 |
| 2010/0078584 | A1 | 4/2010 | Van Den Bijgaart et al. | 251/331 |
| 2010/0137784 | A1 | 6/2010 | Cefai et al. | 604/30 |
| 2010/0151565 | A1 | 6/2010 | De Gier et al. | 435/289.1 |
| 2010/0171054 | A1 | 7/2010 | Stenmark | 251/61.1 |
| 2014/0098161 | A1 * | 4/2014 | Bustgens | 347/44 |

FOREIGN PATENT DOCUMENTS

| | | | | |
|---|---|---|---|---|
| JP | 6-17949 | 6/1994 | | F16K 7/17 |
| JP | 2007-40322 | 2/2007 | | F16K 17/04 |
| JP | 2008-545102 | 12/2008 | | F16K 7/14 |
| JP | 2009-526969 | 7/2009 | | G01N 35/08 |
| JP | 2010-507431 | 3/2010 | | A61M 5/168 |
| WO | WO 2009/149986 | 12/2009 | | F16K 99/00 |

OTHER PUBLICATIONS

Kwang et al., "Topical Review; A review of microvalves," Journal of Micromechanics & Microengineering, Institute of Physics Publishing, Bristol GB, vol. 16, No. 5, pp. R13-R39, May 1, 2006.
International Search Report for International Application No. PCT/EP2012/050835, Apr. 27, 2012.
Chinese Office Action issued in connection with corresponding Chinese Patent Application No. 201280004320.3, dated Aug. 14, 2014.
Notice of Reasons for Rejection issued in connection with corresponding Japanese Patent Application No. 2013-549822, dated Aug. 25, 2015.

* cited by examiner

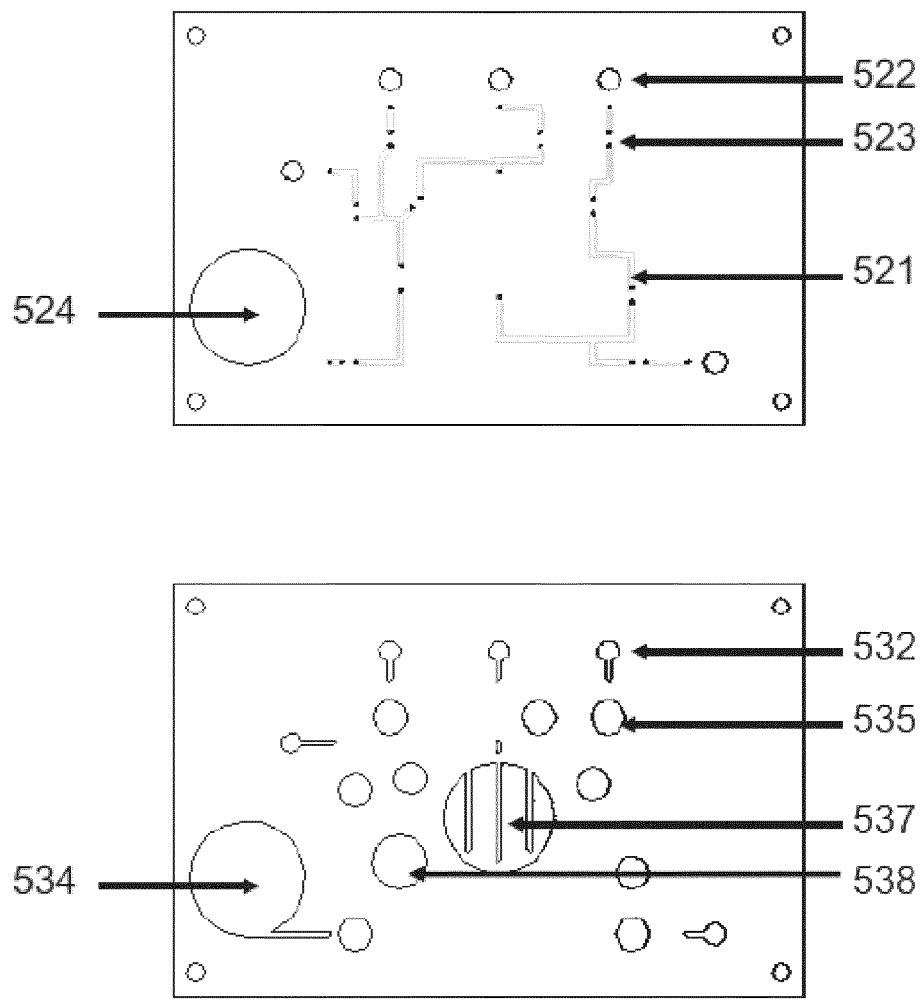
Fig. 5a (top) and b (bottom)

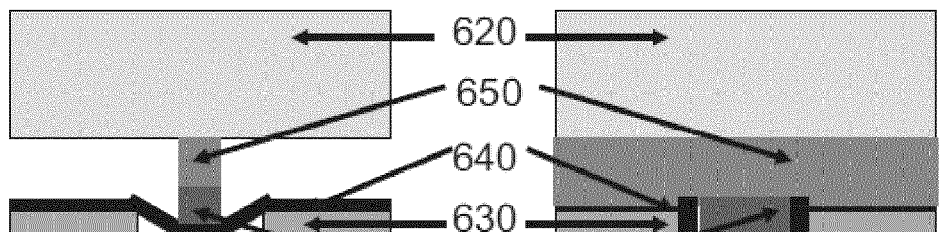
Fig. 6a    Fig. 6b
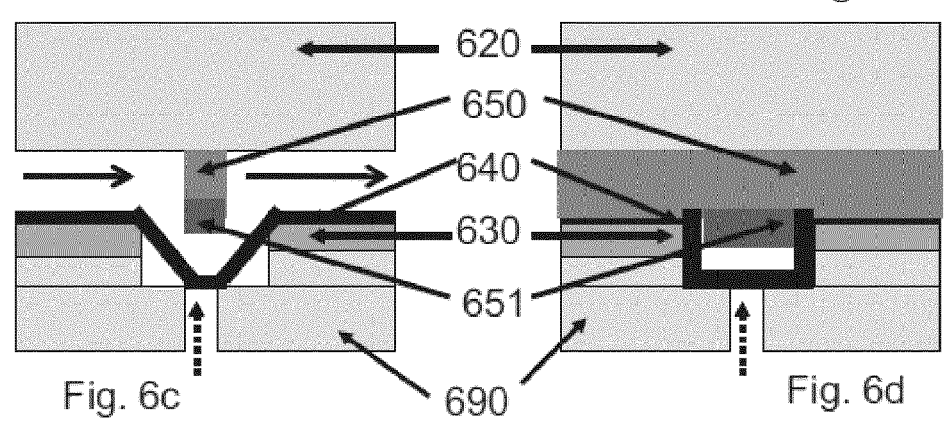
Fig. 6c    Fig. 6d
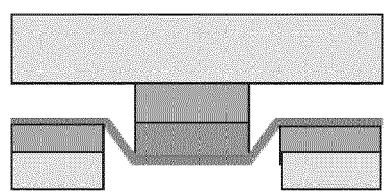 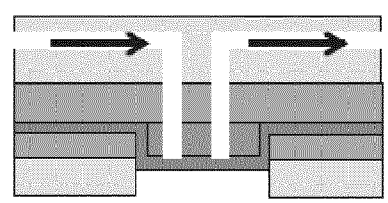
Fig. 6e    Fig. 6f
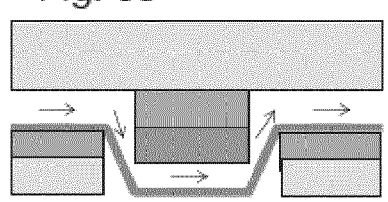 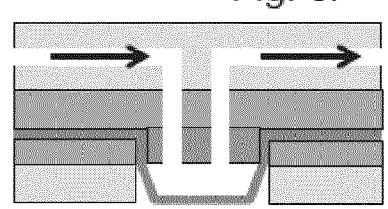
Fig. 6g    Fig. 6h

MICRO-PUMP OR NORMALLY-OFF MICRO-VALVE

FIELD OF THE INVENTION

The invention relates to a micro-valve and/or micro-pump for use in a biosensor, a micro fluidic device, use of such a device, and a micro fluidic element. The invention especially relates to a microfluidic cartridge for diagnostic use. The microfluidic cartridge can be for inserting in a parallel pneumatic interface plate of a pneumatic instrument, an interface plate for interfacing with a microfluidic cartridge and between a pneumatic instrument, a system for fluid actuation inside a microfluidic cartridge comprising such a cartridge and such an interface plate and relates to a pneumatic instrument.

BACKGROUND OF THE INVENTION

Biosensors are used for detection of molecules and/or ions, such as protein, drug, DNA, RNA, hormone, glucose, insulin, enzyme, fungus, bacterium, etc., in a biological sample. The sensor can be used for diagnostic application, but for instance also drugs, either therapeutic or abuse, may be detected in for instance blood, urine and saliva.

Such tests are developed to be used in many different settings, e.g. at the point of care for medical applications, or at any desired place for drugs of abuse (DOA), e.g. at the roadside. In all cases a robust, reliable and sensitive device is required, which must also be low cost since it needs to be disposed after the measurement.

Carrying out such a biochemical assay requires a certain degree of fluid handling, at least the sample fluid must be introduced in the sensing device in order to allow binding of the target molecules to the sensor surface. The term fluid refers to a fluidum, and may refer to a liquid, a gas, and a combination thereof. Depending on a kind of assay more or less complicated microfluidic systems are designed. Since a sample is in itself contaminating it must not get in contact with the instrument and must be stored safely inside e.g. a cartridge during and after a measurement.

There has been focus on development of fully integrated microfluidic on chip biochemical systems or lab on chip systems. An issue in these micro fluidic systems is manipulation of fluids from and to different reaction chambers, for which micro actuators such as pumps and valves are typically needed. Pumping and valving can be done in numerous ways, an overview of micro valve concepts is given in Oh & Ahn and a review of micro pumps by Laser & Santiago (K. W. Oh & C. H. Ahn, 'A review of microvalves', J. Micromech. Microeng. 16 (2006) R13-R39 and D. J. Laster & J. G. Santiago, 'A review of micropumps', J. Micromech. Microeng. 14 (2004) R35-R64).

For integrated cartridges in medical diagnostics or other applications, reliable storage of (bio)chemical reagents is important. For instance, wet reagents may not evaporate and/or leak out while being stored. Some should have no or only limited contact with oxygen or ambient air carrying bacteria and fungi. A valve that is normally closed is preferred. Hence a challenge in microfluidic systems based on active fluid handling using microactuators, i.e. individually addressable valves and pumps, is storage of liquids prior to use of a device, such as a chip or cartridge. To prevent undesired fluid flow and mixing when the chip/cartridge is not addressed, i.e. not in function, reagent chambers need to be sealed. In addition, for long shelf life this sealing must be of high quality, i.e. low permeation of volatile components and no leakage over a long period of time and elevated temperature, while the cartridge is not present in an (analytical) instrument so that powered sealing device cannot be actuated. A further characteristic is that when used these seals should open up easily with means present in the cartridge and instrument. For low cost and complexity it is preferred not to require extra elements, like mechanical piercing or local heating to break the seal, but use the fluid actuation means present for fluid actuation. A known valve or micro-pump is shown in FIG. 1. A diaphragm is closed mechanically by pressing the bottom of the diaphragm into a pressure chamber using an actuator. In a micro-pump the actuator is moved back and forwards. As a valve, it is normally open until closed by the actuator. A problem with such a valve or micro-pump is alignment of the actuator and the pressure chamber or hole (indicated with "1"), especially when there are multiple valves.

Various documents recite valves and use thereof.

US 2010137784 (A1) recites a one-way valve comprising a seat and a membrane having an inner portion that is located over the seat, wherein, in use, the inner membrane portion is selectively deflected from the seat such that a fluid path is created from one side of the membrane to the other so as to open the valve, and wherein an outer peripheral portion of the membrane is stiffer than the inner portion such that the membrane deflection is substantially restricted to only the inner portion. The one-way valve may be used in a pump for an infusion system. This document does not describe a normally closed valve. The membrane is perforated. The valve is dependent on the fluid pressure to actuate the valve. Further, the two-material membrane used is rather complex.

US 2010171054 (A1) recites an integrated microvalve system comprising at least a first fluid branch and a microvalve being controlled by a control pressure in a control channel. The microvalve is adapted to control a fluid flow in the first fluid branch. A flow restrictor arrangement is located between a control port and the control channel to give a pre-determined turn-on and turn-off response characteristics of the microvalve. Preferably the flow restrictor arrangement comprises a deflate channel and an inflate channel arranged in parallel. Each channel comprises a check valve and a flow restrictor, which may have different flow restriction to give different turn-on and turn-off response characteristics for the microvalve.

This document does not describe a normally-closed valve. Inflation and deflation is necessary to operate the valve. The system is not reliable without a power source, e.g. pressure must be maintained adequately to keep the valve shut.

US 2007275455 (A1) describes a valved microfluidics device, microfluidics cell-culture device and system incorporating the devices are disclosed. The valved microfluidics device includes a substrate, a microchannel through which liquid can be moved from one station to another within the device, and a pneumatic microvalve adapted to be switched between open and closed states to control the flow of fluid through a microchannel. The microvalve is formed of three flexible membranes, one of which is responsive to pneumatic pressure applied to the valve and the other two of which deform to produce a more sealable channel cross-section. The cell culture device provides valving to allow controlled loading of cells into the individual well of the device, and exchange of cell-culture components in the wells.

US 2007237686 (A1) recites membrane valves and latching valve structures for microfluidic devices are provided. A demultiplexer can be used to address the latching valve structures. The membrane valves and latching valve structures may be used to form pneumatic logic circuits, including processors.

US 2010151565 (A1) recites a cartridge for the detection of the presence, absence and/or amount of a target nucleotide sequence in a sample comprising one or more nucleic acid sequences. The cartridge comprises a first component and a second component being connectable to each other, the first component comprising at least a first fluid opening and a first sealing surface and the second component comprising at least a second fluid opening and a second sealing surface. Upon connection of the first and second component the first and second fluid opening are in fluid communication and the first and second sealing surfaces are moveable against each other to seal the fluid communication between the first and second fluid opening. The invention is characterized in that the cartridge comprises biasing means for biasing the second sealing surface in the direction of the first sealing surface.

US 2010078584 (A1) recites a valve device comprising a substrate and an elastic membrane, the membrane being joined at least around a valve area to the substrate. The substrate comprises a first channel and a second channel, both ending in the valve area, the first channel having in the valve area a first channel end surface and the second channel having in the valve area a second channel end surface, wherein the area of the first channel end surface is substantially larger than the area of the second channel end surface.

It is a disadvantage of present micro-valves is that these cannot withstand pressures over 1 bar. Also, present micro-valves cannot be used at elevated temperature.

SUMMARY OF THE INVENTION

It is an object of the present invention to provide a micro-valve, a micro-pump, a micro fluidic device, use of such a device, a micro fluidic element or a biosensor, bioreactor or Micro-Total Analysis system including such a micro-valve.

The invention relates to a normally closed micro valve for use in a microfluidic device, comprising a valve seat, an outlet opening, an inlet, and one or more flexible pre-stretched or pre-compressed separators, preferably membranes or diaphragms, the one or more flexible pre-stretched or pre-compressed separators being arranged so that the pre-stretching or pre-compression forces the one or more separators against a valve seat in a normally closed state. As a separator a non-perforated membrane or diaphragm can be used. This has the advantage that the operation of the micro-valve is not dependent on the fluid pressure to actuate the valve and furthermore leads to a more reliable closed state.

Such a valve can be used as a micro fluidic element, in a micro-pump, in a micro fluidic device, etc. Embodiments of the present invention can for instance be applied in any bio-sensing applications where fast, sensitive and cheap tests are required. It can also be applied in cartridges for diagnostic applications and life sciences.

Hence, the present invention provides a valve for use in a chemical sensor, a biosensor, a bioreactor, and includes use in a micro fluidic device for detecting molecules/ions, as well as a system such as a Micro-Total Analysis System. Such biosensors, bioreactors and systems generally have a sampling unit, one or more reagent containers, microfluidic channels interconnecting these, and at least one valve in accordance with an embodiment of the present invention.

As such embodiments of the present invention can overcome one or more of the above disadvantages and/or problems, without jeopardizing other desired characteristics thereof.

A valve in accordance with embodiments of the present invention can be used in cartridges and can have virtually no leakage, which is a significant improvement over the prior art valves. Experiments with the present design showed no failure due to leakage of valves (>100 cartridges have been tested).

It is assumed an increased reliability is mainly due to pre-stretching or pre-compressing of the valve membrane, i.e. the membrane is biased against the valve seat without requiring the necessity of a power source. Optionally, the membrane can be further pressed against the valve seat. Applying a pressure against the side of the membrane remote from the valve seat further increases the leak pressure of valve, e.g. the pressures created in the channel.

The cartridge may contain one or more of a sampling unit, a container such as a reagent container, a filter, a pump, a mixing chamber, a reactor chamber. The cartridge may be a disposable cartridge.

For example, the present invention can provide a valve that can be used in one embodiment in an automated enrichment protocol. The protocol may be implemented by a diagnostic device e.g. in cartridge form that includes the valve and is adapted to optionally isolate, identify, and/or purify pathogen genetic information such as DNA or RNA, or a pathogen protein, an antibody or a fraction of an antibody raised against the pathogen, a pathogen lipid, a pathogen cell membrane or a part thereof, a virus or a part thereof, etc. from a fluid sample such as a body fluid sample, for example a 0.1-10 ml or 1-5 ml full blood sample, a urine sample, a saliva sample, a sperm sample, a sputum sample, a wound exudate sample, a tear sample, an exhaled air sample, etc. Other samples can be obtained from air or water samples, such as polluted air or water samples. The cartridge can for example contain a filter. The filter can for example filter out intact pathogens or parts thereof after selective lysis of cells such as lysis of mammalian, reptilian or avian or insect cells. For example, a means for washing can be provided and after washing, means are provided so that the pathogens can be lysed on the filter and the genetic information such as DNA or RNA is eluted for further purification and optionally amplification, e.g. by PCR. The use of large volume of fluid samples such as blood samples in combination with a filtration approach requires a reliable valve such as provided in embodiments of the present invention that can withstand pressures over 1 bar. These high pressures are needed to obtain sufficient throughput times.

The pre-stretched or precompressed membrane in embodiments of the present invention sealingly contacts the valve seat when the valve is in a normally off condition. For example, the sealing contact can seal a reagent chamber from a channel. Features of a valve in accordance with embodiments of the present invention can be one or more of:

a pre-stretched or pre-compressed flexible membrane or diaphragm and a corresponding valve seat;

that the valve is normally closed, and it is therefore suitable for reagent storage;

To open the valve, a force such as a vacuum is applied on the outer side (opposite fluid channel side) of the membrane (pneumatic actuation);

Optionally, the valve is part of a pump and/or other microfluidic element; and

Pre-stretching or pre-compressing of the separator can optionally be combined with applying pressure on the separator in the closed state, which provides a very reliable valve which does not show leakage using pressures of the order of 0.5-2 bar.

By increasing the size, e.g. height, width or thickness of the valve-seat the membrane can be pre-stretched or pre-compressed further, increasing the resistance to leakage in the closed state, thereby further improving the reliability.

In order to provide this increase of resistance against leakage, the flexible membrane can in an example of the invention be adhered to the body of the valve by a double-sided adhesive tape layer when in pre-stretched or pre-compressed state.

An alternative an independent invention comprises a micro-valve comprising a body portion, a membrane and a valve seat, the body portion having an inlet channel and an outlet channel and wherein the inlet and outlet channels enter a chamber around the valve seat at angle relative to a plane of the membrane between 45 and 135°, preferably between 75 and 105°, more preferably between 80 and 100°, such as 90°, i.e. substantially perpendicular. The valve body may be made of one or more layers of material such as a plastic of which PMMA is one example, and at least part of the inlet and outlet channels are formed by vias through the valve body.

The present invention also includes a system such as Micro-Total Analysis system comprising one or more of a valve according to any of the embodiments of the present invention, a microfluidic element according to any of the embodiments of the present invention or a microfluidic device according to any of the embodiments of the present invention.

BRIEF DESCRIPTION OF THE DRAWINGS

These and other aspects of the invention will be further elucidated with reference to the Figures, in which:

FIGS. 6a-l are diagrammatic cross-sectional views of an embodiment of the present invention.

BRIEF DESCRIPTION OF THE DRAWINGS

Figure 1:
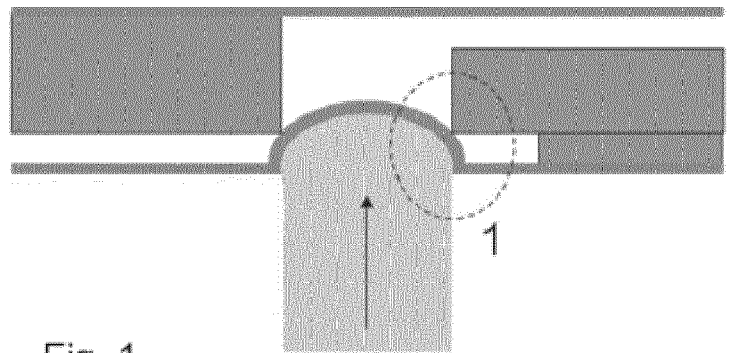
FIG. 1 is a diagrammatic cross-sectional view of a prior art valve.

A Diaphragm valve or membrane valve as provided by embodiments of the present invention comprises a valve body with two or more ports, a diaphragm (or membrane), and a "saddle" or seat upon which the diaphragm closes the valve. A diaphragm valve can be controlled by an actuator.

A diaphragm pump or membrane pump valve as provided by embodiments of the present invention is a positive displacement pump that uses a combination of the reciprocating action of a diaphragm or membrane and a suitable valve such as a non-return check valve to pump a fluid.

A liquid is considered to be an aggregate of matter, comprising molecules or particles, which are able to flow past each other, such as a liquid, a gas, a plasma, and combinations thereof.

Body fluid is to be interpreted broadly and includes liquid or gas obtained from a living or dead creature. It is not limited to humans or mammals but includes any creature that may carry a pathogen such as both vertebrates and invertebrates such as avians, mammals, reptiles, rodents, insects, fish, shell fish.

As used in the description and claims the word "separator" refers to an element that that separates a fluid compartment from other compartments. To achieve this, the separator is preferably not perforated. In accordance with embodiments of the present invention a separator is a permanent layer without holes which would not allow fluid to pass through the layer from a fluid chamber to another element, e.g. to outside the micro-valve.

In accordance with the present invention "pre-stretched" means that the separator is in a tensioned state when the valve is ready for operation and in its rest state, i.e. in the valve before it is actuated. The pre-stretch can be achieved by the valve seat forcing the separator to extend when it is mounted in the valve and/or the separator can be tensioned or extended before bringing it into position on the valve seat.

In accordance with the present invention "pre-compressed" means that the separator is in a compressed state when the valve is ready for operation and in its rest state, i.e. in the valve before it is actuated. The pre-compression can be achieved by the valve seat forcing the separator to compress when it is mounted in the valve and/or the separator can be installed in a compressed state when it is brought into position on the valve seat.

Hence for both pre-stretch and pre-compression, the separator has elastic potential in a normally closed and passive state.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The present invention relates to a valve which is normally closed, that is optionally kept closed without an external force applied. To provide additional security an external force can be applied.

According to a first aspect the invention relates to a normally closed micro-valve for use in a microfluidic device, comprising a valve seat, an outlet opening, an inlet, and one or more flexible pre-stretched or pre-compressed separators, preferably membranes or diaphragms, the and one or more flexible pre-stretched or pre-compressed separators being arranged so that the pre-stretch or the pre-compression forces the one or more separators against a valve seat in a normally closed state.

Advantages are amongst others that if no pressure is used to hold the valve shut then the normally closed valve is closed and passive, that is non-powered and hence is not dependent upon a battery or other power source. This is better than those prior art designs that require a positive closing force to be applied which will mean they require a power source and are non-passive devices. Furthermore, micro-channels may be provided as vias through the body of the valve and such a via design is easy to process using traditional MEMS techniques or macro-techniques such as injection molding.

As a separator a non-perforated membrane or diaphragm can be used. This has the advantage that the operation of the micro-valve is not dependent on the fluid pressure to actuate the valve and furthermore leads to a more reliable closed state.

The valve may be used in a cartridge especially a disposable cartridge such as a diagnostic cartridge. Where a detector is used it may be placed on-board with the valve but it is preferably located outside the cartridge, which makes design and implementation easier. This means an expensive and/or sophisticated detection unit can be made in desktop size while the cartridge is small size and disposable.

The outlet and inlet opening are adapted to allow passage of fluids, in such an amount as is required by an application.

In an example the present valve has one or more of a cavity, a channel, a body portion, a sealing, such as a sealing ring, an adhesive, a flow regulator, such as a flow restrictor, a controller, and a frame. In view of functionality the present valve is provided with a cavity, or container or the like for storing fluid or passing fluid there through. One or more cavities may be present. A cavity can also be used as a reaction and/or a detection chamber. Typically various parts of the present device, such as cavities, valves, regulators, etc. are connected by one or more channels, allowing passage of a fluid. Typically channels are micro-channels, i.e. having a diameter of 1-100 m. The valve typically has a body portion, such as a solid body, typically formed of a plastic or the like, but not limited thereto. In order to perform various functions and/or for storage of fluids, parts of the valve have one or more sealing members. Typically various layers are connected, by an adhesive, such as a double sided adhesive, or layers may adhere by nature and/or by adding adhesives. For flow purposes one or more flow regulators can be provided, such as a restrictor. Also a controller for performing various required functions may be present. The controller can be an on-board microcontroller. The microcontroller may be powered by an on-board power source such as a battery or may include a photovoltaic or solar cell or any other energy scavenging device.

In an example, the present valve further comprises a body portion and wherein the valve seat has a width smaller than a width of one or more flexible pre-compressed or pre-stretched separators, e.g. membranes or diaphragms, and each of the separators has a region that is larger than the valve seat. As such the separator, e.g. membrane or diaphragm, fully covers a valve, can be forced against the valve seat firmly, preventing leakage, can be pre-compressed or pre-stretched sufficiently, and still can operate under external force, such as pressure, which pressure may be (relatively) negative.

In an example the micro-valve further comprises a means for fluid-tight securing of the body portion to the region of each of the one or more flexible pre-compressed pre-stretched separators, e.g. membranes or diaphragms, the region being larger than the valve seat. In one embodiment, preferably, the means for fluid-tight securing is double sided adhesive tape. Such fluid-tight securing provides a longer storage life and allows for higher pressures to be used, thereby e.g. increasing functionality.

In an independent example which may be used with the present invention or with other membrane types than described herein, a valve is provided with a body portion that has an inlet channel and an outlet channel and a valve seat and a membrane, wherein the inlet and outlet channels enter a chamber around the valve seat at an angle relative to a plane of the membrane between 45 and 135°, preferably between 75 and 105°, more preferably between 80 and 100°, such as 90°, i.e. substantially perpendicular. Such channels can be provided as vias and hence can be provided by conventional semiconductor or MEMS processing. As such a more robust design is provided, reducing a risk of damage thereof, and improving storage life and reducing leakage.

In an example the present valve has an opening adapted to allow application of an external force to at least assist in opening the micro-valve. As such the valve may be actuated and perform various functions. The opening may be adapted for use with a table-top detector.

In an example the opening is adapted to allow fluid pressure to be applied to the side of the one or more flexible pre-compressed or pre-stretched separators, e.g. membranes or diaphragms which is remote from the side that makes contact with the valve seat. The fluid pressure is preferably a vacuum. The fluid pressure is typically provided by means, such as pumps, being present in the table top detector which is underneath the device comprising the present valve, e.g. during detection.

In an example a height of the valve seat is 1.1-5 times the first height of the outlet opening, preferably from 1.2-2.5 times, such as from 1.5-2 times. By increasing the height of the valve seat the separator, e.g. membrane or diaphragm is more tightly fixed to the seat, thereby improving storage life and preventing leakage. Further the valve may be operated at higher a pressure. It has been found experimentally that the height need not be too large in order to achieve a desired effect, the height depending somewhat on a type of membrane used. If the increase in height is small, a negligible effect is observed. It has been found experimentally that a significant effect is observed by increasing the height by 20% or more.

In an example the separator, e.g. membrane or diaphragm comprises a material chosen from the group comprising elastomer, such as PDMS, natural and synthetic rubber, saturated and unsaturated rubber, and thermoplastics.

An elastomer is for instance a polymer with the property of viscoelasticity (colloquially "elasticity"), generally having notably low Young's modulus and high yield strain compared with other materials. The Young's modulus may be smaller than 1 MNm-2, such as 0.5 MNm-2. The term, which is derived from elastic polymer, is often used interchangeably with the term rubber, although the latter is preferred when referring to vulcanisates. Each of the monomers which link to form the polymer is usually made of carbon, hydrogen, oxygen and/or silicon. Elastomers are typically amorphous polymers existing above their glass transition temperature, so that considerable segmental motion is possible. At ambient temperatures rubbers are thus relatively soft (E~3 MPa) and deformable. Their primary uses are for seals, adhesives and molded flexible parts.

Examples of elastomers are unsaturated rubbers that can be cured by sulfur vulcanization, such as natural polyisoprene, such as cis-1,4-polyisoprene natural rubber (NR) and trans-1,4-polyisoprene gutta-percha, synthetic polyisoprene (IR for Isoprene Rubber), polybutadiene (BR for Butadiene Rubber), chloroprene rubber (CR), polychloroprene, Neoprene, Baypren etc., butyl rubber (copolymer of isobutylene and isoprene, IIR), halogenated butyl rubbers (chloro butyl rubber: CIIR, bromo butyl rubber: BIIR), styrene-butadiene rubber (copolymer of styrene and butadiene, SBR), nitrile rubber (copolymer of butadiene and acrylonitrile, NBR), also called Buna N rubbers, hydrogenated Nitrile Rubbers (HNBR) such as Therban and Zetpol, saturated rubbers that cannot be cured by sulfur vulcanization, such as EPM (ethylene propylene rubber, a copolymer of ethylene and propylene) and EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone Rubber (FVMQ), fluoroelastomers (FKM, and FEPM) such as Viton, Tecnoflon, Fluorel, Aflas and Dai-El, perfluoroelastomers (FFKM) such as Tecnoflon PFR, Kalrez, Chemraz, Perlast, polyether block amides (PEBA), chlorosulfonated polyethylene (CSM), (Hypalon), ethylene-vinyl acetate (EVA). Various other types of elastomers are: thermoplastic elastomers (TPE), for example Elastron, thermoplastic vulcanizates (TPV), for example Santoprene TPV, thermoplastic polyurethane (TPU), and thermoplastic olefins (TPO). Further examples are proteins such as resilin and elastin, and polysulfide rubber. Also combinations of the above materials are possible.

In an example the present valve separator, e.g. membrane or diaphragm, is pre-stretched to an elongation of more than 1 and up to 10 times the initial size, preferably between 1.05 and 7 times, more preferably between 1.1 and 5 times, such as between 1.25 and 2 times. Depending on a type of separator, e.g. membrane or diaphragm used the separator, e.g. membrane or diaphragm can be pre-stretched to an elongation of 5% more to about 700% more. To obtain an improvement some pre-stretching is necessary, preferably 5% or more is used. A too large pre-stretching runs into typical boundaries of a material, in that a material will rupture or the like, or creep resulting in valve opening, which is undesired. Experimentally the best results are obtained when the separator, e.g. membrane or diaphragm is stretched from 10% to 100%, such as 20% or more.

According to a second aspect the invention relates to a micro fluidic element, such as a micro fluidic pump, comprising a valve according to embodiments of the invention. When operated as a pump, a means for reciprocating motion of the separator, e.g. membrane or diaphragm is provided (e.g. sequential applications of vacuum) in combination with a one-way valve. As the present valve is especially suited for use at elevated temperature and/or for reducing leakage, micro fluidic elements aimed at such use are specifically envisaged.

According to a third aspect the invention relates to a microfluidic device comprising no more than four layers, comprising a cover layer, a first patterned layer underneath the cover layer, an intermediate layer underneath the first patterned layer, and a second patterned layer underneath the intermediate layer, and one or more valves, preferably one or more valves according to the invention.

According to an example of the present invention, a microfluidic cartridge for being placed onto a parallel pneumatic interface plate of a pneumatic instrument is provided. The cartridge comprises a three-dimensional fluid channel in which a fluid is to be transported by pneumatic pumping of a pneumatic instrument. Furthermore the microfluidic cartridge comprises a flexible separator, e.g. membrane or diaphragm, wherein the flexible separator spans a plane and wherein the flexible separator builds an outer surface of the cartridge. Additionally the three dimensional fluid channel is spatially defined in three dimensions by internal walls of the cartridge and by the flexible separator, e.g. membrane or diaphragm, wherein the flexible separator, e.g. membrane or diaphragm is in a ground or rest state when no pressure or vacuum is applied to the flexible separator, e.g. membrane or diaphragm. The flexible separator, e.g. membrane or diaphragm is pneumatically deflectable from the ground state perpendicular to the plane of the flexible separator, e.g. membrane or diaphragm in two directions when the cartridge is placed onto the parallel pneumatic interface plate.

In other words the fluid is not transported over a flat surface but is moved along the three dimensional liquid channel.

Furthermore the flexible separator, e.g. membrane or diaphragm may be pneumatically deflectable in the areas which are part of the outer surface of the cartridge. In other words in a first region the flexible separator, e.g. membrane or diaphragm spans the fluid channel which first region is part of the outer surface of the cartridge. According to this exemplary embodiment the flexible separator, e.g. membrane or diaphragm may additionally extend in a second region under the outer surface of the cartridge, so that the separator, e.g. membrane or diaphragm is not accessible from outside the cartridge in that second region.

Furthermore a "ground state of the flexible separator, e.g. membrane or diaphragm" describes the situation in which neither pressure nor vacuum is applied to the flexible separator, e.g. membrane or diaphragm. Starting from this situation, the flexible separator, e.g. membrane or diaphragm is deflectable towards the inner part of the cartridge and is also deflectable away from the cartridge. This may for example be seen in FIG. 2 in which an upwards and a downwards deflection of the flexible separator, e.g. membrane or diaphragm at different positions along the separator leads to a desired liquid transportation. In other words the flexible separator, e.g. membrane or diaphragm is deflectable in two directions namely towards the fluid channel and away from the fluid channel.

The cartridge, which may in this and in any other embodiment be for example a disposable cartridge, allows pneumatic actuation that is carried out through a reversible pneumatic interconnection between the pneumatic instrument and the cartridge, which interconnection is formed by the flexible separator, e.g. membrane or diaphragm. Pneumatic drivers are integrated in the instrument for a low cost and reliable solution of the cartridge. The actuation of the fluid that is contained in the fluid channel within the cartridge is achieved by the deflection of the flexible separator, e.g. membrane or diaphragm which may be attached to the major surface of the cartridge. Thus when the cartridge is attached to or inserted in the pneumatic interface plate compartments are formed by the flexible separator, e.g. membrane or diaphragm of the cartridge and parts of the pneumatic interface plate. The pressure in these compartments, which pressure may be generated by the separate pneumatic instrument, determines the deflection of the flexible separator, e.g. membrane or diaphragm which in turn actuates the fluid through which a movement is caused.

This microfluidic cartridge takes advantage of the high power and large stroke of pneumatic actuation while at the same time keeping the cartridge simple and at low costs and allowing easy introduction of other physical transport across the interface plate like heat or acoustic vibration.

Furthermore a large number of actuators may be integrated easily into the flat pneumatic interface plate as no individual fixation, like tubing, is required for the pneumatic actuation.

In other words, as pneumatic tubing elements and pressure or vacuum generating elements are not present at the microfluidic cartridge and are not present at the corresponding interconnecting interface plate a large number of actuators can be integrated easily in the interface plate. In other words, a planar microfluidic cartridge is provided which may in connection with a planar pneumatic interface plate allow a convenient and reliable pneumatic driving of fluids in the cartridge without the need of tubing within the cartridge. Furthermore this may easily be extendible to a large number of pneumatic elements as well as the integration of thermal, acoustic or other interface plates in the same plane may be simplified.

The term pneumatic elements in this and every other embodiment of the invention describe positions at which the flexible separator, e.g. membrane or diaphragm is actuated pneumatically, i.e. valves and pumps, or more generally interaction areas. It is also the flexibility of changing positions and being able to have position in close proximity which is an advantage of the present invention.

It may be seen as a characteristic of the provided microfluidic cartridge to realize the actuating of fluids in the cartridge by a pneumatic instrument. The facts, that the pneumatic driving makes use of a flexible cartridge separator, e.g. membrane or diaphragm and that the pneumatic chambers underneath the separator, e.g. membrane or diaphragm are reversibly assembled are important. This means, that the separation plane between the cartridge and the pneumatic instrument crosses the pneumatic chambers.

In other words when the cartridge is removed the pneumatic supply channels, pneumatic channels and pneumatic chambers are open. The chambers underneath the actuated membrane are formed by the combination of the cartridge and the interface plate on the instrument. When the cartridge is lifted up the pressure may not be transferred anymore to the membrane, in contrast to tubing, which is not used for the actuation of the membrane according to the present invention and which tubing is fixed mechanically.

The microfluidic cartridge may be used in combination with a pneumatic instrument, that contains supply channels for the pneumatic driving and that contains a substantially flat interface plate towards the microfluidic cartridge that contains the fluid channels. The fluid channels are confined by a flexible layer, e.g. separator such as a membrane or diaphragm which may be actuated once the cartridge is put on the instrument. By moving the flexible separator, e.g. membrane or diaphragm up and down a volume is displaced inside the cartridge and the separator, e.g. membrane or diaphragm can close channels to provide for a valve function within fluid channel.

The stroke of the separator, e.g. membrane or diaphragm deflection is based on the height between the position of the separator, e.g. membrane or diaphragm when touching the pneumatic interface plate of the pneumatic instrument as may be seen for example in the following FIG. 7 and/or the position when touching the substrate chamber on top of the separator, e.g. membrane or diaphragm in the cartridge (control features).

In other words, the microfluidic cartridge comprises a flexible separator, e.g. membrane or diaphragm covering a fluid path. Thereby the flexible separator, e.g. membrane or diaphragm covers the total fluid channel system that may contain several fluid paths. It does not have to be the complete outer surface everywhere. But also an embodiment is possible in which the flexible separator, e.g. membrane or diaphragm builds the whole outer surface of the cartridge. However, the flexible separator, e.g. membrane or diaphragm is always attached to the cartridge. After the insertion of the cartridge into a pneumatic instrument, the separator, e.g. membrane or diaphragm is locally deflected by pneumatics on the instrument such that the fluid is moved along the fluid path within the cartridge. The separator, e.g. membrane or diaphragm is locally sucked away from or pushed towards the cartridge creating a changing volume in the fluid path and under the separator, e.g. membrane or diaphragm with which volume change the fluid is transported through the cartridge. Furthermore the cartridge may comprise walls that together with the flexible separator, e.g. membrane or diaphragm define a changing volume through which fluid can be transported. Therefore, the invention allows a fluid transportation in the microfluidic cartridge using a relatively simple interface plate between the cartridge and the instrument for processing the cartridge. Instead of interfacing pneumatic tubing, the interface plate between the cartridge and the instrument is formed by a flexible separator, e.g. membrane or diaphragm that is deflected by the instrument such that fluid is transported inside the cartridge.

As the cartridge is free of pneumatic or electrical elements it may be produced in a cheap and reliable way.

The flexible separator, e.g. membrane or diaphragm in combination with an interface plate leads to the possibility to fix the cartridge onto the interface plate only by pneumatic forces. Therefore no other fixation media like e.g. screws and the like may be needed besides the pneumatic forces generated by the pneumatic instrument. That's why the pneumatic interface plate is called a parallel interface. In other words a deflection of the flexible membrane is created in the closed pneumatic system which comprises the cartridge and the interface plate and the deflection in turn leads to the fixation. The sucking in of the membrane creates the fixation.

Cartridges for table-top diagnostics should contain all the reagents they need for the diagnosis and must be able to be stored for long periods without degradation of the final diagnostic result. The diagnostic result should preferably be obtained within 20 minutes maximum. This means the cartridge should be provided not only with all reagents but also should be designed to carry out the microfluidic operations necessary for the diagnosis and to store the reagents safely for long periods. Detection is preferably not being done in the cartridge itself as this makes the cartridge more expensive. It is better to have a complicated and sophisticated and accurate detection device instead that is located in the table-top diagnostic equipment and accesses the cartridge through a window. The window can be for optical, infra-red, ultra-violet, nuclear radiation, or electrical, pneumatic or magnetic detection techniques.

If the cartridge contains a power source to maintain reagent integrity this means the life of the cartridge is reduced and there is the risk that the cartridge will be used after the power supply is depleted which might result in incorrect diagnosis—a potentially life-threatening situation with associated medical product liability.

Even if a power source is used during storage to maintain reagent integrity it is preferred if the powered down situation is still not detrimental, i.e. that there is a fall-back mechanism that still maintains reagent integrity even after the battery is empty.

Battery life can be increased by energy scavenging and this is to be included as an option for the cartridges.

To maintain integrity the present invention proposes a normally-off valve that is prevented from opening by the pre-stretch or pre-compression of the valve separator, e.g. membrane or diaphragm which forces the separator, e.g. membrane or diaphragm against a valve seat. This provides a power-free, that is passive, safe normally off valve that can be used to prevent reagent degradation. In an example a side pressure can be applied to the separator, e.g. membrane or diaphragm to increase security even further. Such may require a power source in the cartridge. In an example the cartridge is pre-pressurized in which case no power source is required. In a further example the separator, e.g. membrane or diaphragm is compressed.

The above also applies to bioreactors.

In an example the present device further comprises one or more valves according to the invention. As such the advantages mentioned are obtained.

In an example the present device comprises one or more containers having a volume of 0.1-10 ml, preferably from 0.5-5 ml, such as 2-3 ml. The containers may for instance be reagent containers, waste containers, reaction chambers, etc.

In an example the present device comprises a microfluidic element according to the invention and/or a sample input unit, and/or one or more processing units. A sample unit may be provided for sampling and/or introducing a sample into the cartridge. Further, one or more processing units, such as analytical units, functional units, etc. may be provided in order to obtain detection or the like. Typically a sample needs to be processed, e.g. a reaction needs to be carried out, filtration needs to take place, separation needs to take place, etc. In a further example also an (electronic) control unit is present.

In an example the present device comprises one or more of a filter, a micro actuator, such as a pump, a seal, an entrance, an outlet, an inlet, and a biasing means. Such is comparable to the present valve.

In an example the present device is one or more of a biosensor, a cartridge, such as a cartridge for diagnostics.

In an example of the present device it is in the form of a disposable cartridge, optionally in a package, which package may be under vacuum or pressure, and/or optionally comprising a further seal for maintaining pressure. Preferably the device is a disposable, to be used once, typically in combination with a table. Further means of maintaining pressure/vacuum may be provided, in order to improve shelf-life.

In an example the present device has a detection window to allow a detector to be placed adjacent to the microfluidic device and to make a detection of presence, absence and/or amount, of one or more molecules and/or ions, such as a protein, drug, DNA, RNA, nucleic acid, nucleic acid sequence, cell membrane or cell membrane fragment, cell organelle, antibody, hormone, glucose, insulin, enzyme, fungus, bacterium, such as pathogenic bacterium, virus, for cell culture, and magnetic particle. Preferably detection takes place on a blood sample, such as of a human being. Also another human body fluid may be tested.

According to a fourth aspect the invention relates to a use for detecting e.g. presence, absence and amount, and/or isolating, and/or purifying one or more molecules and/or ions, such as protein, drug, genetic information such as DNA, RNA, a nucleic acid, a nucleic acid sequence, or a protein such as a hormone, insulin, an enzyme, or other molecules such as glucose, or creatures such as a fungus, a bacterium, such as a pathogenic bacterium, virus, for cell culture, in an array, or in an assay.

According to a fifth aspect the invention relates to a system comprising one or more of a valve to the invention, a microfluidic element according to the invention microfluidic device according to the invention.

The present invention will be further explained with reference to the figures and the description will mainly include exemplary pre-stretched membranes but the scope of the invention is not limited thereby but only by the claims.

FIG. 1 is a diagrammatic cross-sectional view of a prior art valve. The valve has a body with channels therein and a valve chamber. A membrane forms part of the valve, and is shown in the middle sealing off the valve chamber. An actuator (see arrow), applies a pressure to bend the membrane and force it against a valve seat. The area indicated with a dashed circle and number (1) relate to a weak point in the design, in that the design is subject of leakage, specifically in the area indicated. From left to right a (closed) channel is visible.

Figure 2:
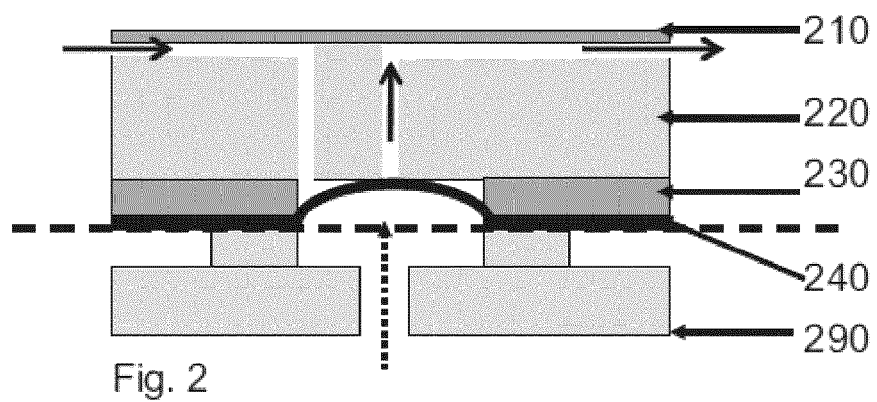
FIG. 2 is an example of a microfluidic device according to an embodiment of the present invention.

In this design a maximum pressure that can be applied on the valves is mainly determined by leakage between valve body and the membrane. It has been found that this is mainly caused by the position of the in- and outlet channels, depending on design. When the channels are positioned just above the membrane layer the cartridge can easily be pushed away locally and the resulting leak increases the pressure in the surrounding areas that are kept under vacuum to keep the cartridge fixed to a table-top detector. FIG. 2 is an example of a microfluidic device according to an embodiment of the present invention. Therein a top (cover) layer (210) is shown, such as a single sided tape. Underneath the top layer a patterned layer (220) is present, such as a molded or laser patterned layer. The patterned layer provides the body of the valve and may be made from a material such as PMMA that can be molded and/or machined either mechanically, electrically or chemically. Underneath the patterned layer double sided adhesive tape may be present (not shown). Thereunder a second patterned layer (230) is present. The patterned layers provide most of the functionality of the device including a valve seat. Under the second patterned layer a sealing member (240), such as a flexible membrane or diaphragm is present. The flexible membrane may be made of materials as indicated above. The membrane also forms part of the valve, shown in the middle. The membrane is not perforated or porous, i.e. it functions as a separator. The membrane has a region that is larger than the valve seat. The membrane is preferably pre-compressed so that a positive force pushes the membrane against a valve seat in its normal and passive condition. This can be achieved by forming the membrane with a convex portion or dome facing the valve seat as shown in FIG. 2. The size of the dome is selected so that when its rest position the dome is compressed against the valve seat. Hence the dome seals off against the valve seat without requiring an additional power source. The dotted arrow indicates a pressure/vacuum optionally being applied to open the valve or a pressure being optionally applied to provide further pressure on the membrane and improve sealing. The solid arrows indicate a direction of flow of fluid through the valve when open. The horizontal dotted line indicates a separation line between the present device and a table-top detection device.

The example shows that the present device has a solid base. As a consequence vacuum is easier applied, without leakage, and further the membrane can be easier and more firmly attached. The present microfluidic device optionally is adapted to rest on, an co-operate with, a table-top device (290), which table-top device provides further functionality, such as pressure/vacuum, diagnostics, etc.

As outlet and inlet are placed substantially perpendicular and at a different position compared to e.g. the prior art of FIG. 1, the influence of outside forces, such as vacuum, is diminished or even absent and much better leakage prevention is obtained.

The table-top device 290 in FIG. 2 may comprise one or more pumping means that drive the present device pneumatically.

In an embodiment the present invention provides a cartridge having one layer less compared to prior art cartridges. A membrane layer, such as a rubber layer becomes a bottom layer of the new cartridge design. The membrane is not perforated or porous, i.e. it functions as a separator, so that it seals the valve from the outside. Cartridges with four layers of which two are patterned (rubber—tape layer—PMMA layer—cover layer) are thus provided. A further advantage is that an interface between the cartridge and the table-top detection device can be now made from a material that can easily be cleaned, such as a metal. A metal (on the table-top device)-rubber connection (on the cartridge) will provide a seal. As such a robust interface is provided, which can be used again and again. Experiments have shown no 'aging' effects (e.g. from a rubber layer). A further advantage is that pressures that can be applied safely (without leakage) on the valves are significantly higher (from ~1 to 3 bar), which pressures can easily be further increased to 5 bar, or even more. Increased pressures allow further functionality, improved processing times, etc.

A further advantage of embodiments of the present invention is that novel cartridge designs and/or novel applications thereof are easy to develop and manufacture, as a standardized and generic platform is provided allowing a multitude of designs and applications. Therefore the present design relates to versatile cartridge technology, which allows for integration of various complex protocols, flexible design, and rapid prototyping. The inventors have shown new designs can be realized and tested within 1 week. In other words, the present invention relates to a generic instrument, being a low cost bench top prototype instrument, that accepts cartridges for running different protocols, and that provides various functions, such as mixing, pumping, filtration, and heating, if required and/or desired.

The present design provides an improvement of the cartridge that improves the robustness of the technology and reduces the number of components in the cartridge.

Figure 3:
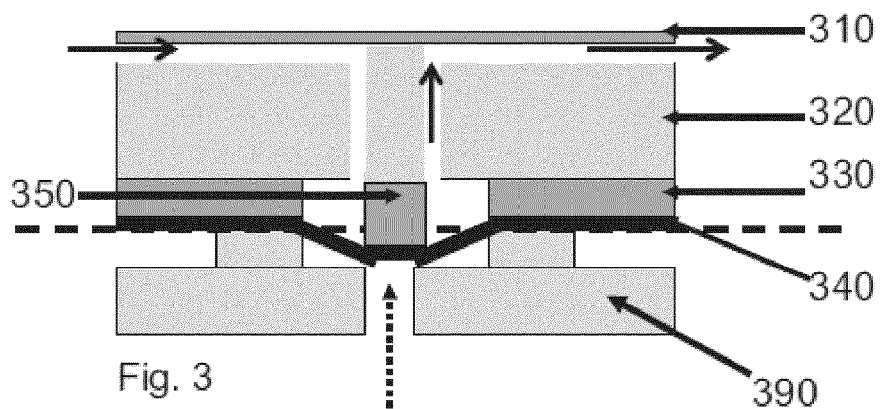
FIG. 3 is an example of a microfluidic device according to an embodiment of the present invention comprising a valve according to any of the embodiments the present invention.

FIG. 3 is an example of a microfluidic device according to a preferred embodiment of the present invention comprising a valve according to an embodiment of the present invention. Similar to FIG. 2 a top layer (310), a first patterned layer (320), a second patterned layer (330), a membrane (340) and table are shown. The patterned layers provide the body of the valve and may be made from a material such as PMMA that can be molded and/or machined either mechanically, electrically or chemically. Underneath the first patterned layer double sided adhesive tape may be present (not shown). The first and second patterned layers form the body of the valve. The patterned layers provide most of the functionality of the device including a valve seat. The valve seat (350) is further indicated, typically being formed from the same material as the second patterned layer. Under the second patterned layer a sealing member (340), such as a flexible membrane or diaphragm is present. To achieve this, the membrane is not perforated or porous, i.e. it functions as a separator. In this embodiment the membrane is pre-stretched so that the membrane is forced against the valve seat in a rest position so that the valve is normally closed. By co-operation between the valve seat and a fixing means for the membrane, the latter can remain in a pre-stretched state. As the membrane is pre-stretched it will seal a space, possibly containing a fluid. As such a storage device is created. The flexible membrane may be made of materials as indicated above. The membrane has a region that is larger than the valve seat. In order to improve sealing between the body of the valve and the membrane, the membrane may be adhered to the second patterned layer. The membrane is preferably pre-stretched so that a positive force pushes the membrane against a valve seat in its normal and passive condition. The dotted arrow indicates a pressure/vacuum optionally being applied to open the valve or a pressure being optionally applied to provide further pressure on the membrane and improve sealing. The solid arrows indicate a direction of flow of fluid through the valve when open. The horizontal dotted line indicates a separation line between the present device and a table-top detection device.

The example shows that the present device has a solid base. As a consequence vacuum is easier applied, without leakage, and further the membrane can be easier and more firmly attached. The present microfluidic device optionally is adapted to rest on, an co-operate with, a table-top device (390), which table-top device provides further functionality, such as pressure/vacuum, diagnostics, etc. The table-top device (390) in FIG. 3 may comprise one or more pumping means that drive the present device pneumatically.

As outlet and inlet are placed substantially perpendicular and at a different position compared to e.g. the prior art of FIG. 1, the influence of outside forces, such as vacuum, is diminished or even absent and much better leakage prevention is obtained. Further, as in this example, the outlet and inlet of the valve are substantially perpendicular to the main plane of the valve, the main plane being perpendicular to the figure, the valve is much more robust and leakage is prevented. The present valve, comprising a fluid, can be stored for more than 6 month, without any leakage being observed. This is a major improvement.

Figure 4:
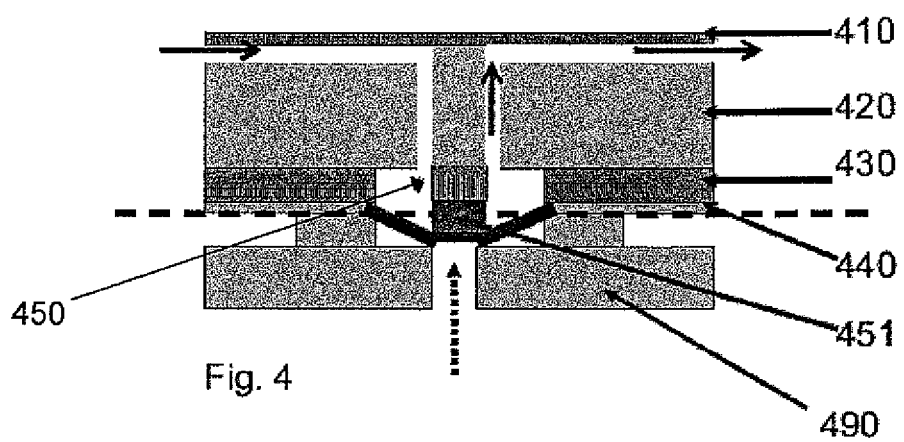
FIG. 4 is an example of a microfluidic device according to an embodiment of the present invention comprising a valve according to any of the embodiments of the invention.

FIG. 4 is an example of a microfluidic device according to the invention comprising a valve according to the invention. Similar to FIG. 3 a top layer (410), a first patterned layer (420), a second patterned layer (430), a membrane (440) and table-top device (490) are shown. A valve seat (450) is further indicated, typically being formed from the same material as the second patterned layer. The valve seat is further increased in size, i.e. in thickness or height by a further layer 451. This increases the pre-stretch of the membrane (440). As such an even better sealing is obtained. To achieve this, the membrane is not perforated or porous, i.e. it functions as a separator. The further layer may be provided by a tape layer that may be applied to the second patterned layer and then itself patterned during manufacture by local laser patterning. The tape may have a PET protection layer present on the top thereof. In order to improve sealing between the body of the valve and the membrane the membrane may be adhered to the second patterned layer. Other details are as described for the device of FIG. 3.

Figure 5C:
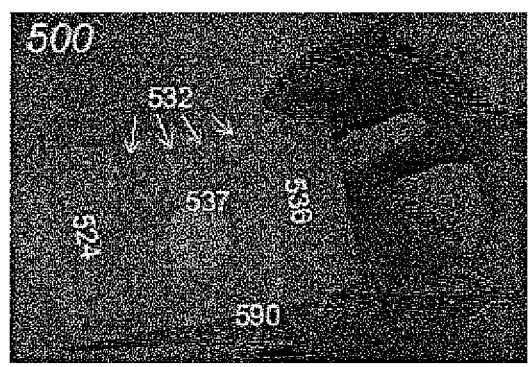
FIG. 5a, b, c is an example of two patterned layers of a device according to an embodiment of the invention.

FIG. 5*a,b,c* is an example of two patterned layers of a device according to the invention. Herein various details may be observed, such as channels (512), vias (523), sampling unit (524, 534), reagent chambers (522, 532), filter (537) outlet/inlet openings (535) waster chamber (536), and valves (538). The two layers are placed together such that channels and containers in one layer communicate with each other. Typically layers are patterned by molding and/or by a laser. Further molecules to be analyzed (590), such as DNA, are indicated.

Figures 6I, 6J:
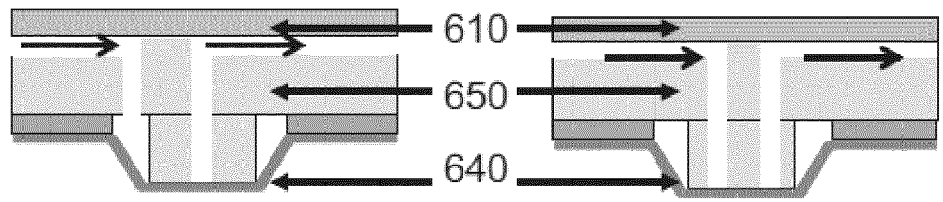
Figures 6K, 6L:
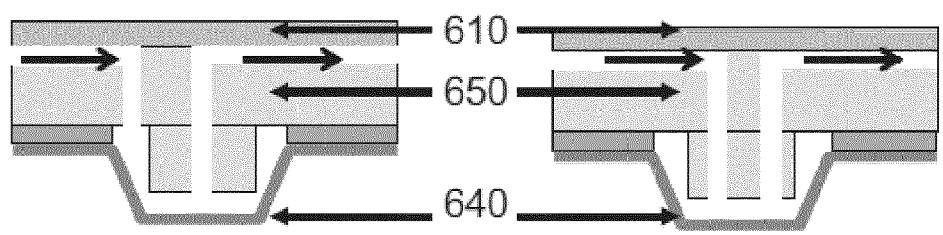

FIG. 6 shows a non-limiting schematic drawing of a valve according to embodiments of the present invention. The essence of these examples is a valve containing a valve seat and a flexible membrane which is pre-stretched around the valve seat e.g. for sealing a reagent chamber from a channel. To achieve this, the membrane is not perforated or porous, i.e. it functions as a separator. The main features are that the valve comprises of a valve seat and a flexible membrane, which valve is normally closed, and therefore suitable for reagent storage. In order to open the valve, a mechanical force such as ac vacuum can be applied on the outer side (namely the side opposite the fluid channel) of the membrane (e.g. a pneumatic actuation); and pre-stretching of the flexible membrane. This arrangement can be combined with optionally applying pressure on the flexible membrane in the closed state to make a very reliable valve which does not show leakage using the pressures of the order of 0.5-2 bar. Experiments (>100 cartridges tested) have not failed due to leakage of valves.

FIGS. 6a-d are diagrammatic cross-sectional views of valves according to embodiments of the present invention. On the left (FIG. 6a) a cross-section of the valve in the closed (top) and open (bottom) state (FIG. 6c) are shown. To open the valve a mechanical force such as a vacuum is applied to an opening below the membrane (640). To achieve this, the membrane is not perforated or porous, i.e. it functions as a separator. The downward movement of the membrane is limited by the upper surface of an opening in the table-top detection device 690. This prevents the membrane from being over-stretched when the valve is opened. Over-stretching could cause plastic deformation or creep this reducing the losing force when the membrane is released. On the right (FIG. 6b,d) cross-sections perpendicular to the channel are shown.

Such cartridges can be constructed by laminating together patterned layers such as laser patterned PMMA layers (620) to form the body of the valve, fixing layers such as double side tape layers ((650), Nitto 5015P) and a membrane such as a rubber layer ((640), latex). The valve seat can be constructed by local laser patterning of a tape layer such as a PET protection layer present on a tape layer (651). This further part (651) of the valve seat may be constructed when forming the second patterned layer (650). When during construction of the device the protection layer is removed, the PET locally stays behind on top of the valve seats.

FIG. 6e-h (top left to down right) is a diagrammatic cross-sectional view of a valves in accordance with further embodiments of the present invention. On the left (FIG. 6e) a cross-section of the valve in the closed (top) and open (bottom) state (FIG. 6g) are shown. In this example the channels run parallel with the plane of the membrane. On the right (FIG. 6f,h) cross-sections of the valve in the closed (top) and open (bottom) state are shown, wherein further the inlet and outlet channels are formed perpendicular or at an angle to the valve membrane. Those channels that run parallel to the membrane plane may be formed by machining or etching matching surfaces of the first and second layers as described above. Those channels that run at an angle or perpendicular to the membrane plane may be formed by as vias through the valve body, e.g. by laser patterning, etching or other forms of machining. In the examples shown the inlet and outlet channels both enter a valve chamber formed between the membrane and the valve seat.

In FIG. 6i-l (top left to down right) two other embodiments of the valve are shown. On the left (FIG. 6i,k) a cross-section of the valve with one of the in-/outlet channels located in the valve seat in the closed (top) and open (bottom) state is shown. On the right (FIG. 6j,l) both in- and outlet channel located in the valve seat, which is similar as above. Those channels that run parallel to the membrane plane are formed between the top layer of the valve body (650) and the cover layer (610). In these examples the valve comprises of a pre-stretched membrane (640), a fluidic part (650) with channels and valve seat, adhesive to bind membrane and a top layer (610) to seal the channels.

Figures 7A, 7B:
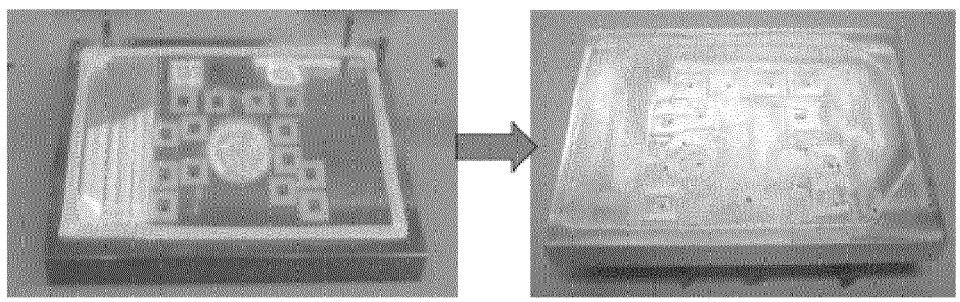
FIG. 7a, b is a photograph of a cartridge and present table according to embodiments of the present invention.

FIG. 7a,b is a photograph of a present cartridge and present table-top detection device, which cartridge is placed on the table-top detection device, indicated by an arrow, and held in place by a vacuum which can be used to both hold the cartridge in place and open the valve(s).

Having described the invention, the following is claimed:

1. A normally closed micro-valve for use in a microfluidic device, comprising
   a valve seat;
   an outlet opening;
   an inlet; and
   flexible pre-compressed or pre-stretched separator arranged so that the pre-compression or pre-stretch forces the separator against the valve seat in a normally closed state to isolate the outlet opening from the inlet, the separator being a non-perforated membrane and configured to be removed from the valve seat when a vacuum force is applied onto the separator.

2. The normally closed micro-valve of claim 1 further comprising:
   one or more of a cavity, a channel, a body portion, a sealing, an adhesive, a flow regulator, a controller, and a frame.

3. The normally closed micro-valve of claim 1 further comprising:
   a body portion,
   wherein the valve seat has a width smaller than a width of the separator, the separator having a region that is larger than the valve seat.

4. The normally closed micro-valve of claim 3, further comprising:
   a means for fluid-tight securing of the body portion to the region of the separator, which is larger than the valve seat.

5. The normally closed micro-valve of claim 3, wherein the body portion has an inlet channel and an outlet channel, the inlet and outlet channels entering a chamber around the valve seat at an angle relative to a plane of the membrane between 45° and 135°.

6. The normally closed micro-valve of claim 1, further comprising:
   an opening adapted to allow application of an external force to assist in opening the micro-valve.

7. The normally closed micro-valve of claim 6, wherein the opening is further adapted to allow fluid pressure to be applied to a side of the separator which is remote from the side that makes contact with the valve seat.

8. The normally closed micro-valve of claim 1, wherein a height of the valve seat is 1.1 to 5 times a first height of the outlet opening.

9. The normally closed micro-valve of claim 1, wherein the separator is comprised of a material chosen from the group consisting of elastomer, natural and synthetic rubber, saturated and unsaturated rubber, and thermoplastics, and
   wherein the separator is more than 1 and up to 10 times an initial size of the separator prior to stretching.

10. The normally closed micro-valve of claim 4, wherein the means for fluid-tight securing is double sided adhesive tape.

11. The normally closed micro-valve of claim 5, wherein said angle relative to the plane of the membrane is between 80° and 100°.

12. The normally closed micro-valve of claim 7, wherein said fluid pressure is a vacuum.

13. The normally closed micro-valve of claim 1, wherein the membrane has a first surface and a second surface facing opposite the first surface, the first surface facing the valve seat, the inlet, and the outlet opening.

14. The normally closed micro-valve of claim 1, wherein a vacuum means applies the vacuum force to the separator to remove the separator from the normally closed stated against the valve seat.

15. A microfluidic element comprising:
a micro fluidic pump, having a valve for use at an elevated temperature and/or for reducing leakage, said valve comprising:
a valve seat,
an outlet opening,
an inlet, and
a flexible pre-compressed or pre-stretched separator arranged so that the pre-compression or pre-stretch forces the separator against the valve seat in a normally closed state to isolate the outlet opening from the inlet, the separator being a non-perforated membrane and configured to be removed from the valve seat when a vacuum force is applied onto the separator.

16. A microfluidic device, comprising:
no more than four layers, the layers comprising a cover layer, a first patterned layer underneath the cover layer, an intermediate layer underneath the first patterned layer, and a second patterned layer underneath the intermediate layer, and
one or more valves, each of said valves comprising
a valve seat,
an outlet opening,
an inlet, and
a flexible pre-compressed or pre-stretched separator arranged so that the pre-compression or pre-stretch forces the separator against the valve seat in a normally closed state to isolate the outlet opening from the inlet, the separator being a non-perforated membrane and configured to be removed from the valve seat when a vacuum force is applied onto the separator.

17. The microfluidic device according to claim 16, further comprising:
a sample input unit, and/or one or more processing units, or one or more containers, or one or more of a filter, a micro actuator, a seal, an entrance, an outlet, an inlet, and a biasing means.

18. The microfluidic device as claimed in claim 16, wherein the device is one or more of a biosensor and a cartridge in a package under vacuum or pressure and comprising a further seal for maintaining pressure.

19. The microfluidic device as claimed in claim 16, further comprising:
a detection window to allow a detector to be placed adjacent to the microfluidic device and to make a detection of presence, absence and/or amount, of one or more molecules and/or ions, including a protein, drug, DNA, RNA, nucleic acid, nucleic acid sequence, cell membrane or cell membrane fragment, cell organelle, antibody, hormone, glucose, insulin, enzyme, fungus, bacterium, pathogenic bacterium, virus, for cell culture, and magnetic particle.

20. The microfluidic device according to claim 16, wherein the device is configured to detect presence, absence and amount, and/or isolate, and/or purify one or more molecules and/or ions, such as protein, drug, DNA, RNA, nucleic acid, nucleic acid sequence, hormone, glucose, insulin, enzyme, fungus, bacterium, pathogenic bacterium, virus, for cell culture, in an array, in an assay.

* * * * *